United States Patent
Marasco et al.

(10) Patent No.: US 10,418,614 B2
(45) Date of Patent: Sep. 17, 2019

(54) ELECTRICAL FEEDTHROUGHS FOR REDISTRIBUTING THERMALLY-INDUCED STRESSES THAT RESULT FROM WELDING

(71) Applicant: Apple Inc., Cupertino, CA (US)

(72) Inventors: Angelo V. Marasco, Sunnyvale, CA (US); Haran Balaram, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 228 days.

(21) Appl. No.: 15/383,446

(22) Filed: Dec. 19, 2016

(65) Prior Publication Data

US 2018/0083256 A1    Mar. 22, 2018

Related U.S. Application Data

(60) Provisional application No. 62/396,627, filed on Sep. 19, 2016.

(51) Int. Cl.
*H01M 2/30* (2006.01)
*H01M 2/08* (2006.01)
*H01M 2/06* (2006.01)

(52) U.S. Cl.
CPC ............. *H01M 2/30* (2013.01); *H01M 2/065* (2013.01)

(58) Field of Classification Search
CPC .......... H01M 2/06; H01M 2/065; H01M 2/30; H01M 2/305; H01M 2/307
See application file for complete search history.

(56) References Cited

U.S. PATENT DOCUMENTS

| | | | |
|---|---|---|---|
| 5,273,845 A * | 12/1993 | McHenry | H01M 2/06 429/180 |
| 7,488,553 B2 | 2/2009 | Tsukamoto et al. | |
| 2005/0003268 A1 | 1/2005 | Scott et al. | |
| 2010/0316896 A1 | 12/2010 | Van Schyndel et al. | |
| 2013/0029215 A1 * | 1/2013 | Signorelli | H01G 11/78 429/179 |
| 2013/0330604 A1 | 12/2013 | Kroll et al. | |
| 2013/0337316 A1 * | 12/2013 | Kroll | C03C 3/19 429/181 |

* cited by examiner

*Primary Examiner* — Stephan J Essex

(74) *Attorney, Agent, or Firm* — Kilpatrick Townsend & Stockton LLP

(57) ABSTRACT

Electrical feedthroughs are presented for redistributing thermally-induced stresses that result from welding. In some embodiments, an electrical feedthrough includes a tubular conduit having a flange at one end. The flange includes a first surface disposed opposite a second surface. The first surface includes at least one of a protrusion and a notch. The electrical feedthrough also includes an electrically-conductive terminal disposed through the tubular conduit. An electrically-insulating material is disposed between the tubular conduit and the electrically-conductive terminal and forms a seal therebetween. The protrusion and the notch are configured individually or as a combination to reduce thermally-induced stresses within the electrically-insulating material that result from welding the flange. Methods for welding such electrical feedthroughs to a wall, such as a wall of a battery housing, are also presented.

19 Claims, 6 Drawing Sheets

US 10,418,614 B2

ELECTRICAL FEEDTHROUGHS FOR REDISTRIBUTING THERMALLY-INDUCED STRESSES THAT RESULT FROM WELDING

CROSS-REFERENCE TO RELATED APPLICATION(S)

The present application claims the benefit under 35 U.S.C. § 119(e) of U.S. Provisional Appl. No. 62/396,627, entitled "Electrical Feedthroughs for Redistributing Thermally-Induced Stresses That Result from Welding," filed on Sep. 19, 2016, which is incorporated herein by reference in its entirety.

FIELD

This disclosure relates generally to electrical feedthroughs used for battery cans, and more particularly, to electrical feedthroughs for redistributing thermally-induced stresses during welding of the feedthrough to the battery can.

BACKGROUND

An electrical feedthrough may be employed to make an electrical connection through a battery housing or "can". In some variations, a welding process may be used to physically couple the electrical feedthrough to a wall of the housing. However, heating and cooling of the electrical feedthrough during the welding process can generate thermally-induced stresses. These thermally-induced stresses may cause cracks within the electrical feedthrough, especially within an electrically-insulating material of the electrical feedthrough. It will be appreciated that electrically-insulating materials for electrical feedthroughs are often ceramic materials or glass materials. Such materials tend relieve high stresses by cracking, unlike metal materials which plastically deform or stretch. Cracks within the electrically-insulating material are undesirable as a sealing capability of the electrical feedthrough is reduced. An electrical insulating capability of the electrical feedthrough may also be lost.

SUMMARY

The following disclosure relates to electrical feedthroughs for redistributing thermally-induced stresses that result from welding. In some embodiments, an electrical feedthrough includes a tubular conduit having a flange at one end. The flange includes a first surface disposed opposite a second surface. The first surface includes at least one of a protrusion and a notch. The electrical feedthrough also includes an electrically-conductive terminal disposed through the tubular conduit. An electrically-insulating material is disposed between the tubular conduit and the electrically-conductive terminal and forms a seal therebetween. The protrusion and the notch are configured individually or as a combination to reduce thermally-induced stresses within the electrically-insulating material that result from welding the flange. In some embodiments, the notch is a first notch and the second surface includes a second notch.

In some embodiments, a battery includes a battery housing having a wall and electrode assembly disposed therein. The electrode assembly includes at least an electrode. The battery also includes an electrical feedthrough disposed through the wall of the battery housing. The electrical feedthrough includes a tubular conduit having a flange at one end. The flange includes a first surface disposed opposite a second surface. The first surface includes at least one of a protrusion and a notch. The second surface is disposed against the wall of the battery housing. The flange is welded to the wall of the battery housing. The electrical feedthrough also includes an electrically-conductive terminal disposed through the tubular conduit and electrically-coupled to the electrode. An electrically-insulating material is disposed between the tubular conduit and the electrically-conductive terminal and forms a seal therebetween. In some embodiments, the notch is a first notch and the second surface includes a second notch.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

To store and supply electrical energy, battery cells commonly employ an electrode assembly, which includes a separator interposed between a cathode electrode and an anode electrode. The separator serves, in part, to regulate electrochemical reactions between the cathode electrode and the anode electrode. Because such electrochemical reactions can be negatively influenced by ambient hazards (e.g., moisture, dust, sharp objects, impacts, etc.), battery cells often enclose the electrode assembly in a battery housing. The battery housing, sometimes referred to as a "can," isolates and protects the electrode assembly from its ambient environment.

When enclosed, the electrode assembly relies on an electrical path through the battery housing to receive and deliver electrical energy. This electrical path is often provided by an electrical feedthrough. The electrical feedthrough is disposed in a wall of the battery housing and is electrically-coupled to either the cathode electrode or the anode electrode. A common configuration includes one electrical feedthrough for each of the cathode electrode and the anode electrode. However, if the battery housing is electrically-conductive, the battery housing may serve as an electrical feedthrough, typically for the anode electrode.

Battery housings are being increasingly designed with small side walls, which reflect thinning allocations of space within target applications (e.g., mobile devices, portable electronics, etc.). These small side walls support coupling between the electrode assembly (e.g., the cathode electrode, the anode electrode, etc.) and one or more electrical feedthroughs. However, conventional electrical feedthroughs are ill-suited for small side walls due to their poor tolerance of welding processes when scaled to smaller dimensions, as there is a reduced volume of material to accommodate the stresses caused by the heating and cooling cycles associated with the welding process.

A conventional electrical feedthrough, when scaled to accommodate a small side wall, experiences high temperature gradients during welding, which in turn, leads to high stress gradients. High stress gradients can cause sealing materials in the conventional electrical feedthrough to crack or fracture, negating the possibility of a hermetically-sealed battery housing. As will be described below in relation to FIGS. 1A & 1B, stress gradients associated with side wall heights less than 10 mm can be particularly acute.

Figure 1A:
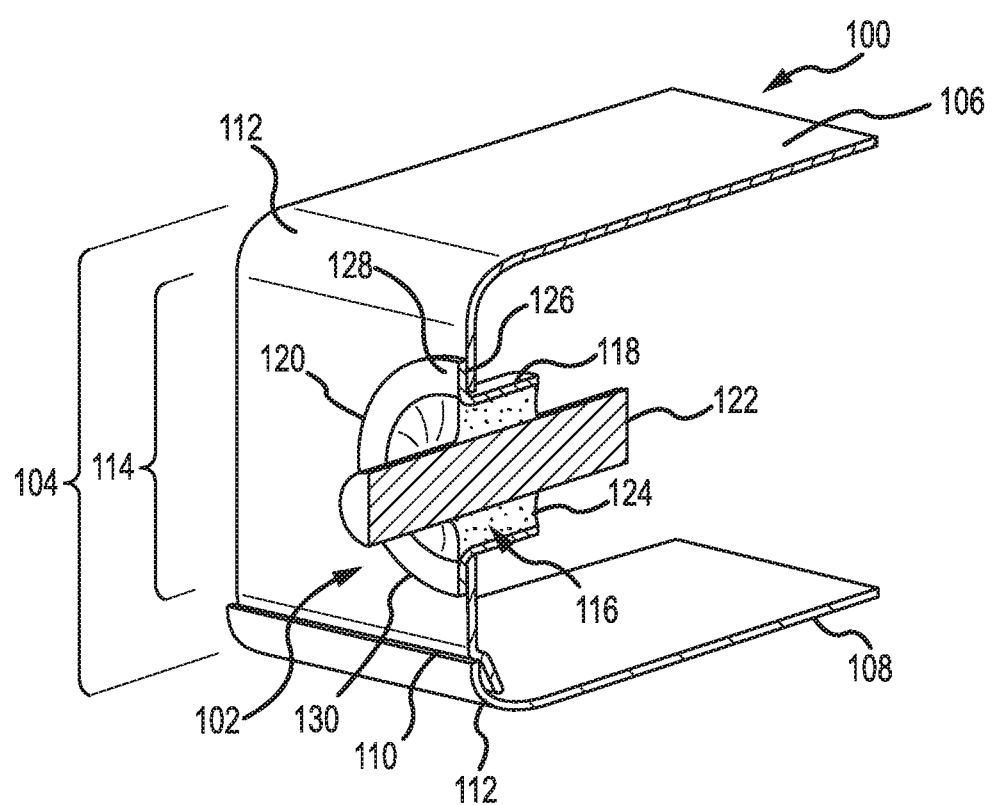
FIG. 1A is a perspective view, in cross-section, of a portion of a battery housing having an electrical feedthrough.

Now referring to FIG. 1A, a perspective view is presented, in cross-section, of a portion of a battery housing 100 having an electrical feedthrough 102. The electrical feedthrough 102 is disposed through a side wall 104 of the battery housing 100. The battery housing 100 includes a first wall 106 and a second wall 108 that meet along a seam 110 within the side wall 104. The seam 110 may be crimped, welded, brazed, etc. to form a hermetically-sealed joint. The battery housing 100 also includes rounded corners 112 formed into the first wall 106 and the second wall 108. The rounded corners 112 straddle a portion of the side wall 104 defining a flat surface 114. The flat surface 114 includes an opening 116 through which the electrical feedthrough 102 is disposed.

The electrical feedthrough 102 includes a tubular conduit 118 that terminates at one end in a flange 120. The tubular conduit 118 has an outer diameter slightly less than dimensions of the opening 116 (e.g., to allow a sliding fit). The tubular conduit 118 and the flange 120 may be formed of a metal body (e.g., a stainless steel body). The electrical feedthrough 102 also includes a terminal 122 disposed through the tubular conduit 118. The terminal 122 is formed of an electrically-conductive material, such as aluminum, and may extend past both ends of the tubular conduit 118, as shown in FIG. 1A. A sealing material 124 is interposed between the terminal 122 and the tubular conduit 118 to couple the terminal 122 to the tubular conduit 118. The sealing material 124 is formed of an insulating material, such as a glass material. Hence, the sealing material 124 is operable to electrically insulate the terminal 122 from the tubular conduit 118 and establish a first hermetic seal therebetween.

The flange 120 has an interior-facing surface 126 disposed against the flat surface 114 and an exterior-facing surface 128 oriented away from the side wall 104. The flange 120 is dimensioned such that overlap between the interior-facing surface 126 and the flat surface 114 is sufficient to allow a second hermetic seal to form during welding. Moreover, an outer circumference 130 of the flange 120 and a position of the opening 116 are such that the interior-facing surface 126 maintains contact only with the flat surface 114. The flange 120 does not contact the seam 110 or extend past a rounded corner 112, either of which, would impede or prevent the second hermetic seal from forming.

Figure 1B:
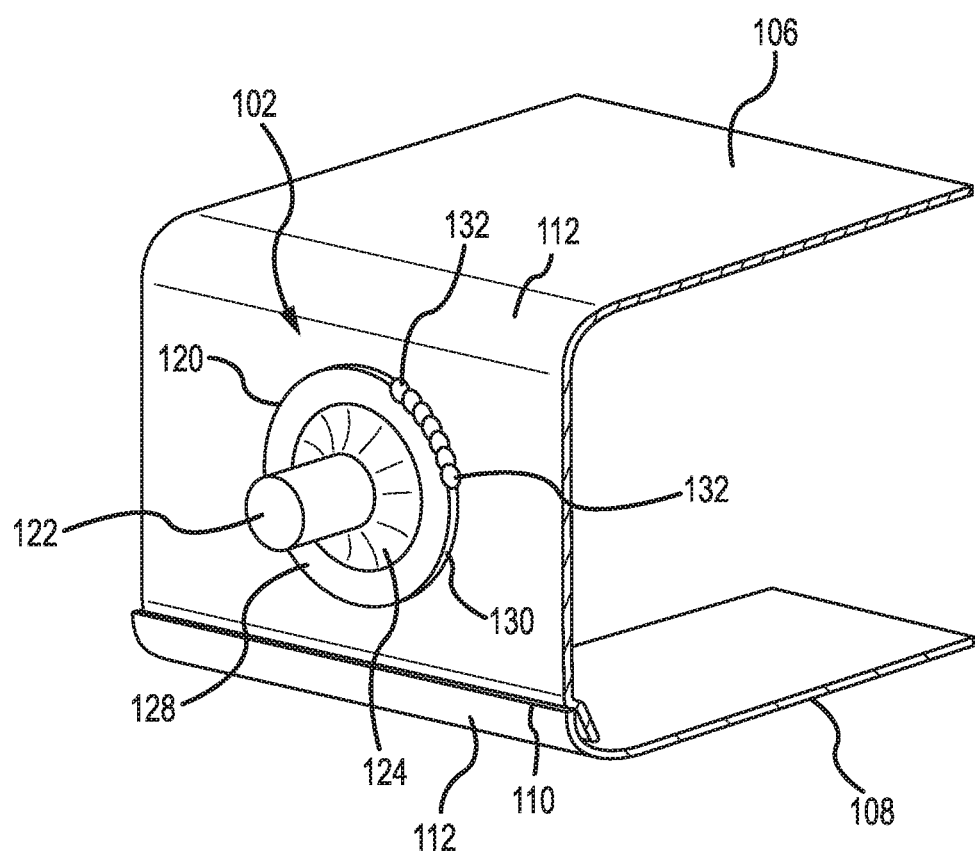
FIG. 1B is a perspective view, in cross-section, of the portion of the battery housing of FIG. 1A, but with a continuous sequence of spot-welds formed along a portion of an outer circumference of an electrical feedthrough.

FIG. 1B presents a perspective view, in cross-section, of the portion of the battery housing 100 of FIG. 1A, but with a continuous sequence of spot-welds 132 formed along a portion of the outer circumference 130. During manufacture, the electrical feedthrough 102 disposed through the opening 116 and heat from an energy source (e.g., a torch, a laser, an ultrasonic tip, etc.) is applied to a point along the outer circumference 130. Such heat melts a portion of the flange 120 (e.g., a spot on the flange 120) and involves the interior-facing surface 126 and an adjacent portion of the flat surface 114. Upon cooling, a metallurgical bond forms between the flange 120 and the flat surface 114. The energy source is then displaced clockwise (or counterclockwise) along the outer circumference 130 to establish a continuous sequence of spot-welds. This continuous sequence, when completed around the outer circumference 130, hermetically seals the electrical feedthrough 102 to the battery housing 100.

It will be appreciated that features of the side wall 104 (e.g., the seam 110, the rounded corner 112, etc.) limit space available for positioning the electrical feedthrough 102. As such, the space (height-wise) is notably less than an overall height of the side wall 104. To adapt to this limited space, the electrical feedthrough 102 can be scaled in dimensions. However, for side-wall heights less than 10 mm, the flange 120 may narrow (in annular width) to such an extent that, during welding, a high temperature gradient is established across the sealing material 124. This high temperature gradient can, in turn, induce a high stress gradient through the sealing material 124. Because the flange 120 and the terminal 122, being formed of metal, have different coefficients of thermal expansion than the sealing material 124, which is formed of ceramic or glass, the sealing material 124 may crack to relieve high stress experienced during welding (e.g., heating, cooling, etc.). This cracking is undesirable as the hermetic seal between the flange 120 and the terminal 122 is lost. If cracking in the sealing material 124 is extensive, coupling of the terminal 122 to the tubular conduit 118 may also be lost.

Re-design of the battery housing 100 to increase space on the side wall 104 is typically prevented by neighboring components within a target application. Such neighboring components create physical boundaries that constrain a volume and configuration of the battery housing 100. For many target applications (e.g., mobile and portable devices), these neighboring components limit the battery housing 100 to thin allocations of space. The neighboring components may also interfere with relocating the electrical feedthrough 102 to other, more spacious walls on the battery housing 100. Moreover, costs to mitigate the negative impacts of the seam 110 and the rounded corners 112 to space on the side wall 104 may be prohibitive. For example, and without limitation, the seam 110 may be positioned by those skilled in the art to best facilitate the insertion and sealing of the electrode assembly within the battery housing 100. Relocation of the seam 110 elsewhere may require additional processing steps during manufacturing of a battery cell. Similarly, the rounded corners 112 may be present on the battery housing 100 due to an increased cost of manufacturing precise squared corners.

Disclosed herein are electrical feedthroughs suitable for welding to walls, including small side walls of for battery housings. The electrical feedthroughs include features such as a protrusion, a notch, or both, disposed on or in a flange. During welding, these features redistribute thermally-induced stresses throughout a structure of the electrical feedthrough, and away from the insulating material. Such redistribution reduces stresses experienced by sealing materials that couple an electrically-conductive terminal to a tubular conduit. Since the electrical feedthroughs may utilize glass and ceramic materials as sealing materials, the redistribution of thermally-induced stresses reduces a risk of cracking of the relatively fragile electrically-insulating materials. The electrical feedthroughs may also include other features for redistributing stress, such as tapers along the tubular conduit. Illustrative embodiments of the electrical feedthroughs and their corresponding features are described below in relation to FIGS. 2A-3.

Figure 2A:
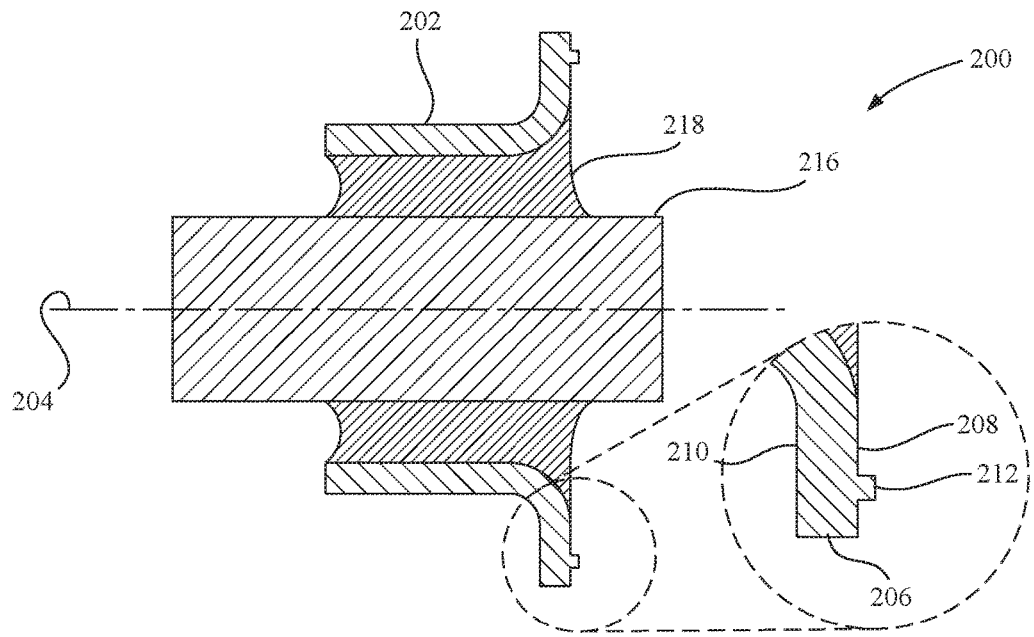
FIG. 2A is a cross-sectional view of an electrical feedthrough for redistributing thermally-induced stresses that result from welding, according to an illustrative embodiment.

Now referring to FIG. 2A, a cross-sectional view is presented of an electrical feedthrough 200 for redistributing thermally-induced stresses that result from welding, according to an illustrative embodiment. The electrical feedthrough 200 includes a tubular conduit 202, which extends along a longitudinal axis 204. The tubular conduit 202 may have any type of cross-section (e.g., circular, elliptical, hexagonal, etc.). In some embodiments, the cross-section may vary along the longitudinal axis 204. In FIG. 2A, the tubular conduit 202 is depicted as a cylinder having a straight, spherical cross-section. However, this depiction is not intended as limiting. The tubular conduit 202 terminates in a flange 206 at one end. In combination, the tubular conduit 202 and the flange 206 define a single body that is formed of a metal for welding. Non-limiting examples of the metal for welding include nickel, molybdenum, stainless steel, titanium, and aluminum. Alloys of these metals for welding are also possible.

The flange 206 includes a first surface 208 disposed opposite a second surface 210. The first surface 208 is faces away from the tubular conduit 210. In some embodiments, such as shown in FIG. 2A, the first surface 208 and the second surface 210 are parallel to a plane that is perpendicular to the longitudinal axis 208. It will be appreciated that, when the electrical feedthrough 200 is welded to a wall, the first surface 208 functions as an exterior-facing surface and the second surface 210 functions as an interior-facing surface (i.e., a surface disposed against the wall). The first surface 208 includes a protrusion 212, a notch 214 (see e.g., FIG. 2B), or both (see e.g., FIG. 2C). The protrusion 212 and the notch 214 are configured individually or as a combination to prevent an electrically-insulating material from cracking in response to welding of the flange 206. Such prevention results from redistributing thermally-induced stresses during heating and cooling of the flange 206.

Figure 2B:
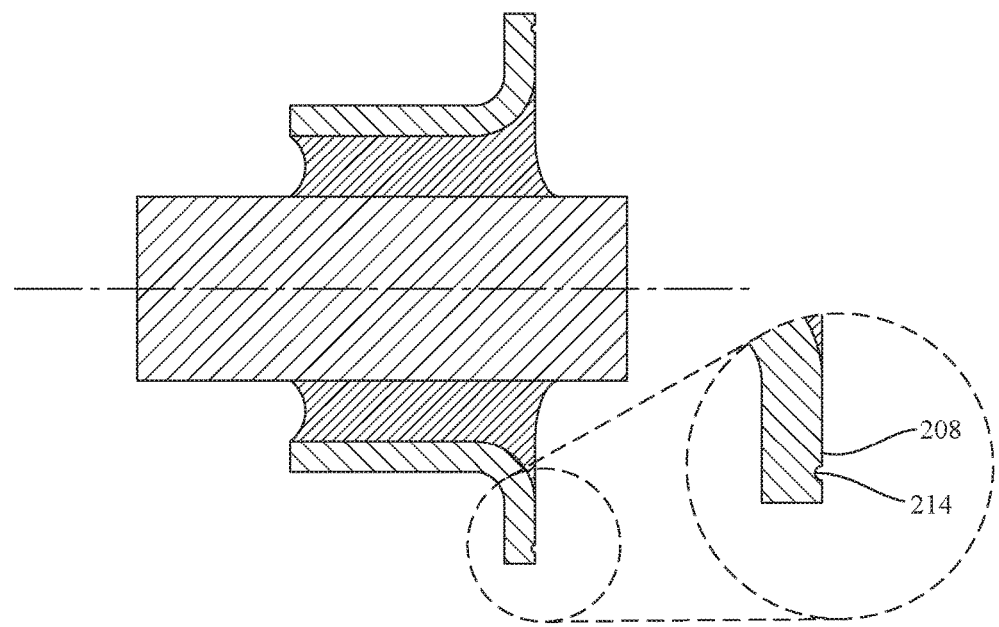
FIG. 2B is a cross-sectional view of the electrical feedthrough of FIG. 2A, but with a first surface having only a notch, according to an illustrative embodiment.
Figure 2C:
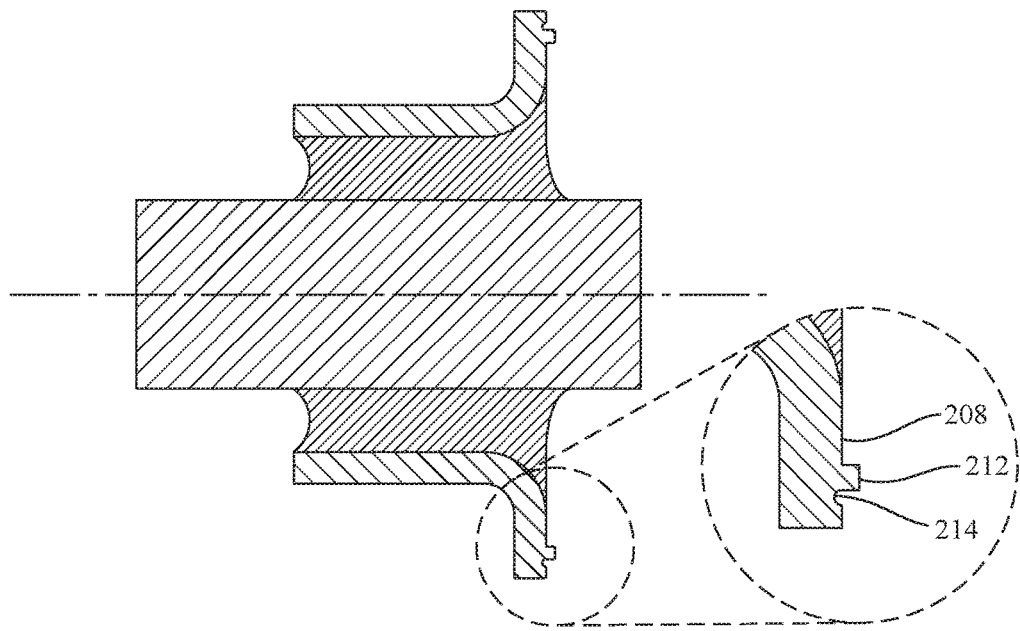
FIG. 2C is a cross-sectional view of the electrical feedthrough of FIG. 2A, but with the first surface having a protrusion and a notch, according to an illustrative embodiment.

In FIG. 2A, only the protrusion 212 is depicted. However, this depiction is not intended as limiting. For example, and without limitation, FIG. 2B presents a cross-sectional view of the electrical feedthrough 200 of FIG. 2A, but with the first surface 208 having only the notch 214, according to an illustrative embodiment. In another non-limiting example, FIG. 2C presents a cross-sectional view of the electrical feedthrough 200 of FIG. 2A, but with the first surface 208 having both the protrusion 212 and the notch 214, according to an illustrative embodiment. However, other combinations of the protrusion 212 and the notch 214 are possible (e.g., multiple instances of the protrusion 212, multiple instances of different protrusions, multiple instances of the notch 214, multiple instances of different notches, combinations of multiple protrusions and notches, etc.). For clarity, some features of FIG. 2A are not labeled in FIGS. 2C & 2D.

FIGS. 2A-2C depict the protrusion 212 and the notch 214 as having a continuous, annular structure (e.g., a circular rib with a square cross-section and a circular groove with a hemispherical cross-section). However, this depiction is for purposes of illustration only. In general, the protrusion 212 and the notch 214 may be any structure capable of varying locally a cross-sectional profile of the first surface 208 (e.g., from a flat cross-sectional profile). This variation may be a localized increase (e.g., the protrusion 212) or a localized decrease (e.g., the notch 214) of the cross-sectional profile of the first surface 208. The variation may also be along a radial direction, an angular direction, or both.

Now referring back to FIG. 2A, the electrical feedthrough 200 also includes an electrically-conductive terminal 216 disposed through the tubular conduit 202. The electrically-conductive terminal 216 may be centered within the tubular conduit 202 and may extend past one or both ends of the tubular conduit 202. In FIG. 2A, the electrical-conductive terminal 216 is depicted as centered and extending past both ends of the tubular conduit 202. However, this depiction is not intended as limiting. The electrically-conductive terminal 216 may have any type of cross-section (e.g., circular, square, elliptical, hexagonal, etc.). Moreover, the electrically-conductive terminal 216 may be formed of any material having an electrical conductivity greater than $10^3$ S/m. In some embodiments, the electrically-conductive terminal 216 is formed of metal. Non-limiting examples of the metal include copper, silver, gold, platinum, aluminum, titanium, tungsten, molybdenum, and iron. Other metals are possible, including alloys thereof (e.g., steel, stainless steel, copper alloys, aluminum alloys, titanium alloys, etc.).

The electrical feedthrough 200 additionally includes an electrically-insulating material 218 disposed between the tubular conduit 202 and the electrically-conductive terminal 216. The electrically-insulating material 218 couples the tubular conduit 202 to the electrically-conductive terminal 216 and forms a seal therebetween (e.g., an annular seal). The electrically-insulating material 218 may be any material having an electrical resistivity greater than $10^8$ Ω-cm (e.g., a ceramic material, a glass material, etc.). The electrically-insulating material 218 may also have a dielectric strength greater than 10 kV/mm. It will be understood that the electrically-insulating material 218 is stable at processing temperatures needed to weld the flange 206. For example, and without limitation, the electrical-insulating material 218 may have a melting temperature higher than a processing temperature needed to weld the flange 206. In another non-limiting example, the electrical-insulating material 218 may have a decomposition temperature higher than the processing temperature needed to weld the flange 206. Other temperatures of stability are possible (e.g., sublimation, chemical reaction, etc.) In some embodiments, the electrically-insulating material 218 is formed of a glass material. In these embodiments, the glass material may have a softening temperature higher than a welding temperature for the flange 206. In some embodiments, the seal defined by the electrically-insulating material 218 is a hermetic seal.

In operation, the electrical feedthrough 200 is disposed through an opening in a wall, such as a wall of a battery housing (e.g., the side wall 104 of FIGS. 1A & 1B). A heat source is applied to a point along an outer circumference of the flange 206 to weld the electrical feedthrough 200 to the wall. During application of the heat source, heat melts a portion of the flange 206 and flows to cooler portions of the electrical feedthrough 200. Such heat flow includes a flow of heat through the electrically-insulating material 218 (e.g., radially towards the electrically-conductive terminal 216). However, the electrically-insulating material 218 expands at a rate different than the flange 206 or the tubular conduit 202. This difference in expansion rate induces stresses to develop within the electrical feedthrough 200. For large temperature gradients, a cumulative expansive strain may induce stresses sufficiently high to cause the electrically-insulating material 218 to crack (which may include cracks along interfaces with the tubular conduit 202 and the electrically-conductive terminal 216).

Moreover, as the heat source moves progressively around the outer circumference of the flange 206, changes in heat flow cause formerly hot portions of the electrical feedthrough 200 to cool. Because the electrically-insulating material 218 contracts at a rate different than the flange 206, a cumulative contractive strain may also induce stresses sufficiently high to cause the electrically-insulating material 218 to crack—even if cracking did not occur during heating. It will be appreciated that the flange 206 and the tubular conduit 202, being formed of metal, are softer bodies at or near welding temperatures. Thus, upon cooling, the flange 206 and the tubular conduit 202 may be less pliable and therefore less accommodating of deformations that would otherwise relieve stress and prevent cracking in the electrically-insulating material 218.

The protrusion 212, the notch 214, or both, serve to redistribute the thermally-induced stresses throughout a structure of the electrical feedthrough 200. For the protrusion 212, an increased volume of material functions to receive and dilute stress therein. As such, the protrusion 212 can interrupt and attenuate thermally-induced stresses flowing towards the electrically-insulating material 218. In contrast, the notch 214 provides a decreased volume of material that receives and concentrates stresses therein. Concentration of stresses can induce local deformations in the notch 214 that relieve stresses. The notch 214 can therefore also interrupt and attenuate stresses flowing towards the electrically-insulating material 218.

It will be appreciated that those skilled in the art can configure the protrusion 212, the notch 214, and combinations thereof, to reduce or eliminate thermally-induced stresses experienced by the electrically-insulating material 218. This reduction or elimination mitigates cracking of the electrically-insulating material 218 during welding (or as a result of welding). The protrusion 212, the notch 214, or both, may also be configured to allow, after welding, a uniform residual stress in the electrically-insulating material 218 (e.g., a uniform compressive stress). This uniform residual stress does not crack or fracture the electrically-insulating material 218. Establishment of the uniform residual stress may be aided by embodiments of the protrusion 212 and the notch 214 having continuous annular structures.

In some embodiments, the protrusion 212 includes a continuous annular rib. The continuous annular rib may be of any diameter and may have any cross-sectional profile (e.g., square, hemispherical, trigonal, ogee curved, etc.). Moreover, the cross-sectional profile of the continuous annular rib may vary with angular position around the first surface 208 (e.g., vary in protrusion height, width, etc.). In some embodiments, the protrusion 212 includes a discontinuous annular rib. The discontinuous annular rib may include any number of gaps therein. The discontinuous annular rib may be of any diameter and may have any cross-sectional profile (e.g., square, hemispherical, trigonal, ogee curved, etc.). Moreover, the cross-sectional profile of the discontinuous annular rib may vary with angular position around the first surface 208 (e.g., vary in protrusion height, width, etc. within continuous portions). In some embodiments, the protrusion 212 includes a bump. The bump may be any discrete shape (e.g., a hemispherical bump, a pyramidal bump, an arcuate bump, etc.) and occupy any position on the first surface 208. Multiple bumps are possible, including combinations of differently-shaped bumps.

In some embodiments, the notch 214 includes a continuous annular groove. The continuous annular grove may be of any diameter and may have any cross-sectional profile (e.g., square, hemispherical, trigonal, ogee curved, etc.). Moreover, the cross-sectional profile of the continuous annular groove may vary with angular position around the first surface 208 (e.g., vary in depth, width, etc.). In some embodiments, the notch 214 includes a discontinuous annular groove. The discontinuous annular groove may include any number of filled portions therein. The discontinuous annular groove may be of any diameter and may have any cross-sectional profile (e.g., square, hemispherical, trigonal, ogee curved, etc.). Moreover, the cross-sectional profile of the discontinuous annular groove may vary with angular position around the first surface 208 (e.g., vary in depth, width, etc. within continuous portions). In some embodiments, the notch 214 includes an indent (or dimple). The indent may be of any shape (e.g., circular, square, arcuate, etc.) and occupy any position on the first surface 208. Multiple indents are possible, including combinations of differently-shaped indents.

The flange 206 of the electrical feedthrough 200 may also have a notch disposed on the second surface 210. In some embodiments, the notch 214 is a first notch and the second surface 210 includes a second notch 220. In these embodiments, a combination of the second notch 220 with the protrusion 212, the notch 214, or both, is configured to prevent the electrically-insulating material 218 from cracking in response to welding of the flange 206. The second notch 220 may be any structure capable of locally decreasing a cross-sectional profile of the second surface 210 (e.g., from a flat cross-sectional profile). The decrease may be along a radial direction, an angular direction, or both.

Figure 2D:
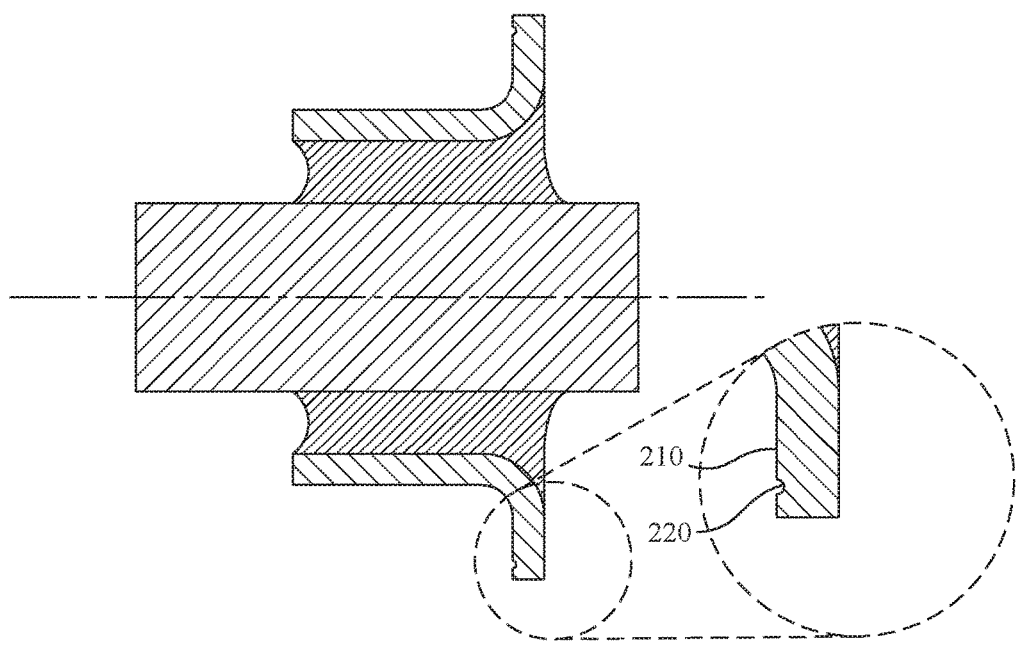
FIG. 2D is a cross-sectional view of the electrical feedthrough of FIG. 2A, but with a second notch disposed on a second surface of a flange, according an illustrative embodiment.
Figure 2E:
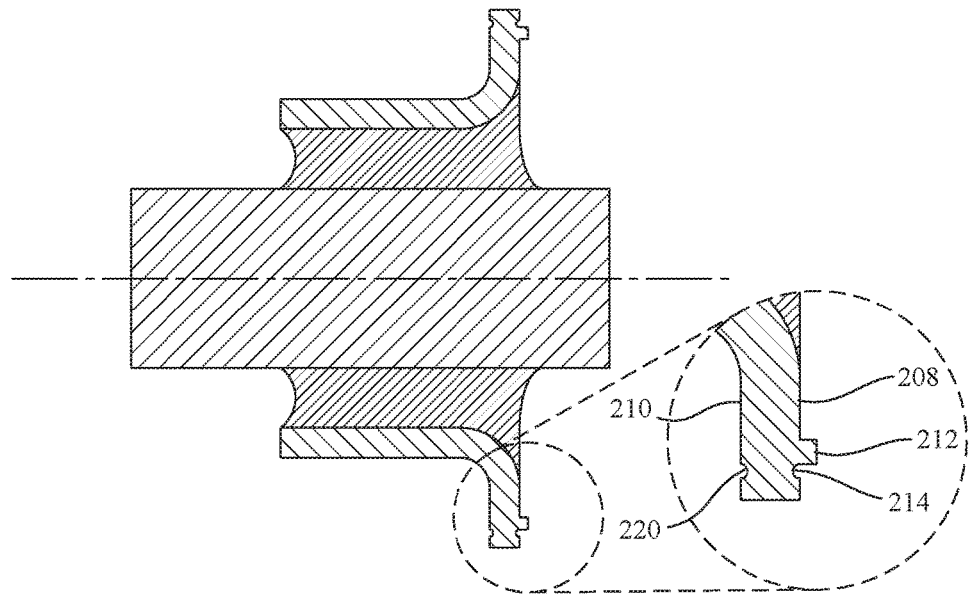
FIG. 2E is a cross-sectional view of the electrical feedthrough of FIG. 2A, but with a protrusion, a first notch, and a second notch present on the flange, according to an illustrative embodiment.

FIG. 2D presents a cross-sectional view of the electrical feedthrough 200 of FIG. 2A, but with the second notch 220 disposed on the second surface 210, according to an illustrative embodiment. In FIG. 2D, the protrusion 212 is absent the first surface 208. However, this depiction is not intended as limiting. The second notch 220 may be present in any combination with the protrusion 212 and the first notch (e.g., the notch 214) on the flange 206. For example, and without limitation, FIG. 2E presents a cross-sectional view of the electrical feedthrough of FIG. 2A, but with the protrusion 212, the first notch (e.g., the notch 214), and the second notch 220 all present on the flange 206, according to an illustrative embodiment. For clarity, some features from FIG. 2A are not labeled in FIGS. 2D & 2E.

FIGS. 2D & 2E depict the second notch 220 as having an equivalent cross-sectional profile and radial position as the notch 214 (as being an annular structure of similar radial position). However, this depiction is for purposes of illustration only. The second notch 220 may have any type of cross-sectional profile and position on the second surface 210 (independent of the notch 214). Moreover, second notch 220 is not limited to being a single instance, as shown in FIGS. 2D & 2E. Multiple instances of the second notch 220 are possible, including different instances of the second notch 220. Embodiments described above in relation to the notch 214 (e.g., the continuous annular groove, discontinuous annular groove, the indent, etc.) may be applicable to the second notch 220, in some embodiments.

Features of the electrical feedthrough 200 for redistributing thermally-induced stresses are not restricted to protrusions and notches on the flange 206. In some embodiments, the tubular conduit 202 includes a taper 222 that narrows when traversing a direction away from the flange 206. A combination of the taper 222 with the protrusion 212, the notch 214, or both, is configured to reduce or eliminate thermally-induced stresses experienced by the electrically-insulating material 218. This reduction or elimination mitigates cracking of the electrically-insulating material 218 during welding (or as a result of welding). The combination involving the taper 222 may, in some instances, also include the second notch 220.

Figure 2F:
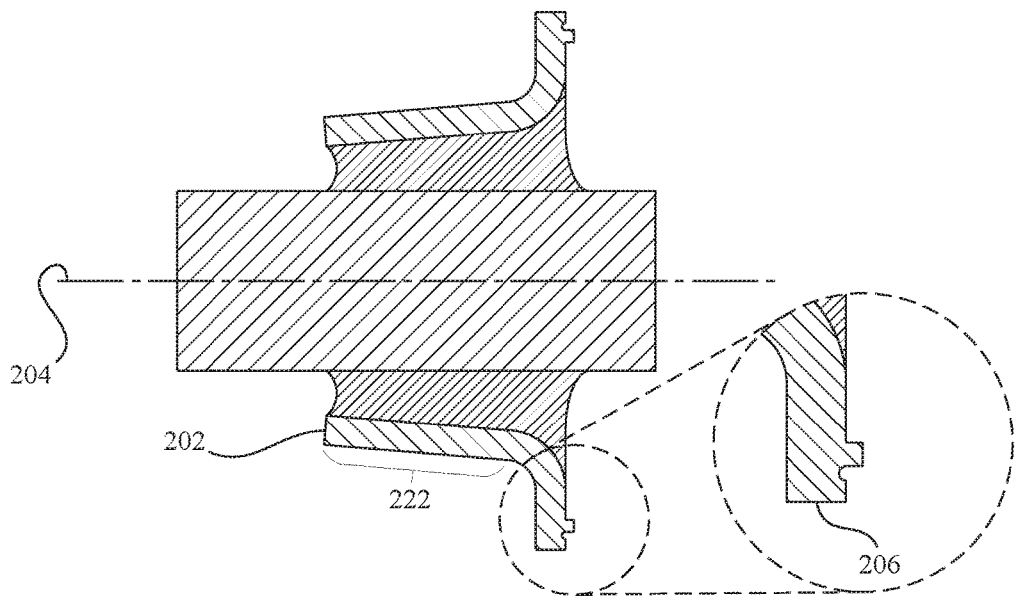
FIG. 2F is a cross-sectional view of the electrical feedthrough of FIG. 2A, but with a taper disposed along a tubular conduit, according to an illustrative embodiment.

FIG. 2F presents a cross-sectional view of the electrical feedthrough 200 of FIG. 2A, but with the taper 222 disposed along the tubular conduit 202, according to an illustrative embodiment. For clarity, some features from FIG. 2A are not labeled in FIG. 2F. The taper 222 decreases in diameter as a distance is traversed along the longitudinal axis 204 away from the flange 206. In some embodiments, the tubular conduit 202 may include a reinforcing structure (e.g., a circumferential rib, a tubular bump, etc.). The reinforcing structure may be disposed on an interior surface or an exterior surface of the tubular conduit 202. In addition to strengthening the tubular conduit 202, the reinforcing structure may interrupt and attenuate stresses propagating through the tubular conduit 202 away from the flange 206. For example, and without limitation, the tubular conduit 202 may include a circumferential rib disposed on the exterior surface. The circumferential rib may have any cross-sectional profile and may be disposed at any location on the exterior surface. In another non-limiting example, the tubular conduit 202 may include a tubular bump on the interior surface. The tubular bump may have any type of discrete shape (e.g., a hemispherical bump, a pyramidal bump, an arcuate bump, etc.) and be disposed at any location on the interior surface. In some instances, the tubular bump may be one of many tubular bumps disposed on the inner surface (e.g., one bump in a pattern of bumps). Other types of reinforcing structures are possible for the tubular conduit 202.

To accommodate a small wall (i.e., less than 10 mm), the electrical feedthrough 200 may scale in dimension (e.g., miniaturize) to fit within a flat surface of the small wall. However, scaling the electrical feedthrough 200 may be restricted by the electrically-conductive terminal 216: Thinner gauges for the electrically-conductive terminal 216 increase a resistance experienced by currents passing therethrough, which may result in undesirable losses of electrical energy. Thinner terminal gauges may also increase a difficulty in sealing the electrically-conductive terminal 216 to the tubular conduit 202. Thus, scaling the electrical feedthrough 200 may emphasize a size reduction of the flange 206. Features that redistribute thermally-induced stresses, such as the protrusion 212, the notch 214, the second notch 220, the taper 222, and so forth, allow an annular width of the flange 206 to be reduced without risking cracks in the electrically-insulating material 218 during welding. These features therefore allow the flange 206 to be scaled thereby making the electrical feedthrough 200 suitable for small walls.

Scaling of the flange 206 may involve altering an outer diameter of the flange 206. In some embodiments, the outer diameter of the flange 206 ranges from 0.1 to 10 mm. In further embodiments, the outer diameter of the flange 206 ranges from 0.2 to 2.0 mm. In these embodiments, the outer diameter may have a lower limit. Non-limiting examples of the lower limit include greater than or equal to 0.2 mm, greater than or equal to 0.4 mm, greater than or equal to 0.6 mm, greater than or equal to 0.8 mm, greater than or equal to 1.0 mm, greater than or equal to 1.2 mm, greater than or equal to 1.4 mm, greater than or equal to 1.6 mm, and greater than or equal to 1.8 mm. The outer diameter may also have an upper limit. Non-limiting examples of the upper limit include less than or equal to 2.0 mm, less than or equal to 1.8 mm, less than or equal to 1.6 mm, less than or equal to 1.4 mm, less than or equal to 1.2 mm, less than or equal to 1.0 mm, less than or equal to 0.8 mm, less than or equal to 0.6 mm, and less than or equal to 0.4 mm. The upper limit and the lower limit may be combined in any variation as above to produce a range for the outer diameter.

Scaling of the flange 206 may also involve a diameter of the electrically-conductive terminal 216, which may range from 5% to 95% of the outer diameter of the flange 206. In some embodiments, the electrically-conductive terminal 216 has a diameter that ranges from 20 to 70% of the outer diameter of the flange 206. In these embodiments, the diameter may have a lower limit. Non-limiting examples of the lower limit include greater than or equal to 30%, greater than or equal to 40%, greater than or equal to 50%, and greater than or equal to 60%. The diameter may also have an upper limit. Non-limiting examples of the upper limit include less than or equal to 70%, less than or equal to 60%, less than or equal to 50%, less than or equal to 40%, and less than or equal to 30%. The upper limit and the lower limit may be combined in any variation as above to produce a range for the diameter. Moreover, embodiments of the diameter be combined in any variation with embodiments of the outer diameter. For example, and without limitation, the outer diameter of the flange 206 may be less than 1.8 mm and the diameter of the electrically-conductive terminal 216 may range from 50 to 50% of the diameter of the flange 206. In another non-limiting example, the outer diameter of the flange 206 may range from 1.2 to 1.6 mm and the diameter of the electrically-conductive terminal 216 may be less than 60% of the diameter of the flange 206. In still another non-limiting example, the outer diameter of the flange 206 may range from 1.6 to 2.0 mm and the diameter of the electrically-conductive terminal 216 may range from 30 to 40% of the diameter of the flange 206. Other combinations are possible.

Figure 3:
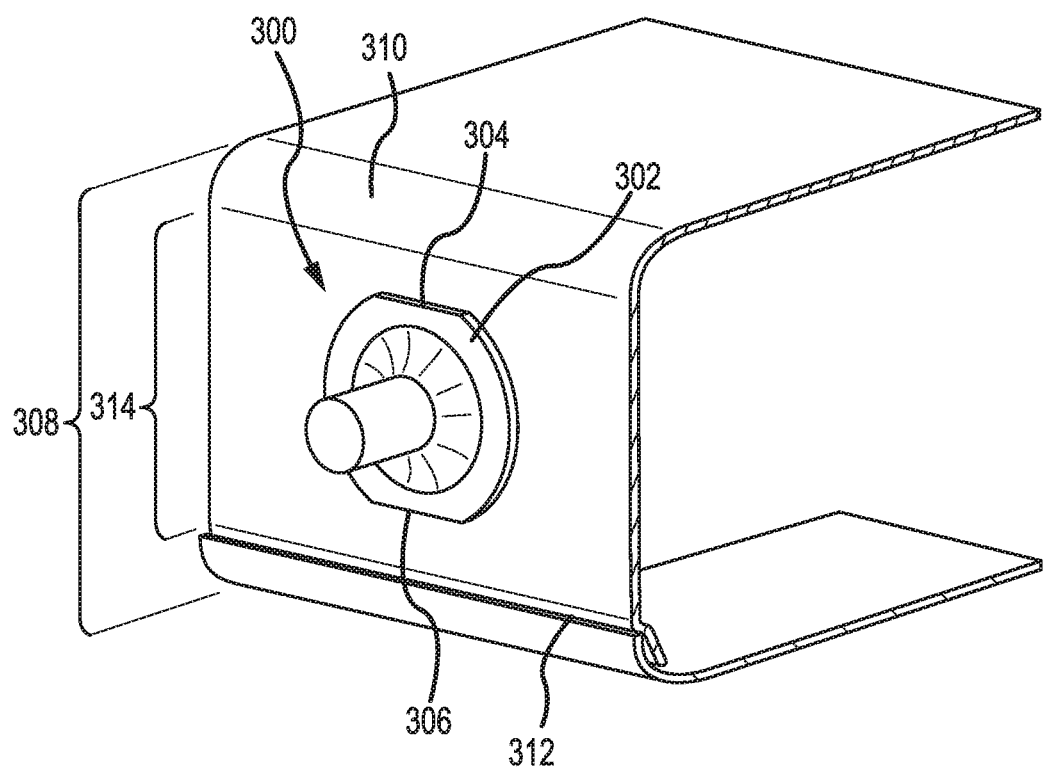
FIG. 3 is a perspective view of an electrical feedthrough having a flange that includes a first flat edge disposed opposite a second flat edge, according to an illustrative embodiment.

The flange 206 may include alterations to its perimeter shape to reduce space occupied on a flat surface of the small wall. In some embodiments, the flange 206 includes a circular circumference with a flat edge disposed therealong. The flat edge may allow the flange 206 to accommodate a rounded edge or a seam of the small wall. Multiple instances of the flat edge a possible. FIG. 3 presents a perspective view of an electrical feedthrough 300 having flange 302 that includes a first flat edge 304 disposed opposite a second flat edge 306, according to an illustrative embodiment. The electrical feedthrough 300 is analogous to the electrical feedthrough 200 described in relation to FIGS. 2A-2F and is disposed through a small wall 308, such as a small wall of a battery housing. FIG. 3 illustrates only a portion of the small wall 308. The small wall 308 includes a rounded-edge 310 and a seam 312 that straddle a flat surface 314. The electrical feedthrough 300 is disposed through the flat surface 314 such that the first flat edge 304 and the second flat edge 306 are aligned parallel to borders defined by, respectively, the rounded-edge 310 and the seam 312. The first flat edge 304 and the second flat edge 306 allow the electrical feedthrough 300 to fit within a limited space (e.g., heightwise) defined the rounded edge 310 and the seam 312. However, the first flat edge 304 and the second flat edge 306 allow the flange 302 to have a wider profile elsewhere along its outer perimeter.

Although not shown in FIG. 3, the flange 302 includes at least one of a protrusion and a notch on an exterior-facing surface (e.g., a first surface). These features redistribute thermally-induced stresses such that a presence of the first flat edge 304 and the second flat edge 306 do not cause cracking in an electrically-insulating material during welding. The flange 302 may also include other features for redistributing thermally-induced stress, e.g., those discussed in relation to FIGS. 2A-2F (e.g., a second or interior-facing notch, a taper on a tubular conduit, etc.).

It will be appreciated that the electrical feedthroughs described in relation to FIGS. 2A-2F & 3 may be deployed in battery housings for batteries. The battery housings may include a small wall having a wall height. Non-limiting examples of the wall height include less than 10 mm, less than 8 mm, less than 6 mm, and less than 2 mm. The small wall may include a flat surface having a flat-surface height. Non-limiting examples of the flat-surface height include less than or equal to 8 mm, less than or equal to 7 mm, less than or equal to 6 mm, less than or equal to 5 mm, less than or equal to 4 mm, less than or equal to 3 mm, less than or equal to 2 mm, and less than or equal to 1 mm. The flat-surface height may be combined in any variation with the wall height, provided the flat-surface height is less than the wall height.

According to an illustrative embodiment, a battery includes a battery housing having a wall and an electrode assembly disposed therein. In some instances, the wall is a small wall as disclosed above. The electrode assembly includes an electrode, which may be a cathode electrode or an anode electrode. The battery also includes an electrical feedthrough disposed through the wall of the battery housing. The electrical feedthrough is analogous to the electrical feedthroughs described in relation to FIGS. 2A-2F & 3. The electrical feedthrough includes a tubular conduit having a flange at one end. The flange includes a first surface disposed opposite a second surface. The first surface includes at least one of a protrusion and a notch. The second surface disposed against the wall of the battery housing. The flange is welded to the wall of the battery housing.

The electrical feedthrough also includes an electrically-conductive terminal disposed through the tubular conduit and electrically-coupled to the electrode (e.g., electrically-coupled to the cathode electrode or the anode electrode). An electrically-insulating material is disposed between the tubular conduit and the electrically-conductive terminal and forms a seal therebetween. The protrusion and the notch are configured individually or as a combination to reduce thermally-induced stresses within the electrically-insulating material that result from welding the flange.

In some embodiments, the notch is a first notch and the second surface includes a second notch. In some embodiments, the tubular conduit includes a taper that narrows along a direction away from the flange. In some embodiments, the flange includes a circular circumference with a flat edge disposed therealong. In some embodiments, the flange has an outer diameter that ranges from 0.1 mm to 10 mm. In certain instances, the outer diameter may range from 0.2 mm to 2.0 mm. In further embodiments, the electrically-conductive terminal has a diameter that ranges from 20% to 70% of the outer diameter of the flange. In some embodiments, the battery housing is electrically coupled to an electrode different than the electrical feedthrough. This different electrode has a polarity opposite that of the electrode to which the electrically-conductive terminal is electrically-coupled.

It will be appreciated that the electrical feedthroughs described in relation to FIGS. 2A-2F & 3 may be used with methods for welding to join with a wall, such as a wall of a battery housing. These methods of welding may hermetically seal the electrical feedthroughs to the wall. According to an illustrative embodiment, a method for welding an electrical feedthrough to a wall includes applying heat to an outer circumference of a flange to melt at least a portion thereof. The flange defines one end of a tubular conduit having an electrically-conductive terminal disposed therethrough. Moreover, the electrically-conductive terminal is coupled to the tubular conduit via a seal, which is formed by an electrically-insulating material. The method additionally includes redistributing heat-induced stress (thermally-induced stress) using at least one of a protrusion and an exterior notch disposed on an exterior-facing surface of the flange. Such redistribution reduces stresses within the electrically-insulating material that result from applying heat to (or removing heat from) the flange. Reduction of stress may prevent failure of the seal. For example, and without limitation, preventing failure of the seal may involve preventing cracks from forming within the electrically-insulating material, preventing cracks along interfaces between the electrically-insulating material and the tubular conduit, preventing cracks along interfaces between the electrically-insulating material and the electrically-conductive terminal, and so forth.

In some embodiments, redistributing heat-induced stress includes redistributing heat-induced stress using an interior notch disposed on an interior-facing surface of the flange. In some embodiments, redistributing heat-induced stress includes redistributing heat-induced stress using a taper on the tubular conduit that narrows when traversing a direction away from the flange. In some embodiments, redistributing heat-induced stress includes establishing a uniform compressive stress within the electrically-insulating material.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electrical feedthrough, comprising:
    a tubular conduit having a flange at one end, the flange comprising a first surface disposed opposite a second surface, the first surface comprising a protrusion and a notch;
    an electrically-conductive terminal disposed through the tubular conduit;
    an electrically-insulating material disposed between the tubular conduit and the electrically-conductive terminal and forming a seal therebetween; and
    wherein the protrusion and the notch are configured individually or as a combination to reduce thermally-induced stresses within the electrically-insulating material that result from welding the flange, and wherein the protrusion is positioned between the notch and the electrically-conductive terminal.

2. The electrical feedthrough of claim 1, wherein the protrusion comprises a continuous annular rib.

3. The electrical feedthrough of claim 1, wherein the protrusion comprises a discontinuous annular rib having one or more gaps therein.

4. The electrical feedthrough of claim 1, wherein the protrusion comprises a bump.

5. The electrical feedthrough of claim 1, wherein the notch comprises a continuous annular groove in the first surface.

6. The electrical feedthrough of claim 1, wherein the notch comprises a discontinuous annular groove in the first surface having one or more filled portions therein.

7. The electrical feedthrough of claim 1, wherein the notch comprises an indent.

8. The electrical feedthrough of claim 1, wherein the notch is a first notch, and the second surface comprises a second notch.

9. The electrical feedthrough of claim 1, wherein the tubular conduit comprises a taper that narrows when traversing a direction away from the flange.

10. The electrical feedthrough of claim 1, wherein the tubular conduit comprises a circumferential rib.

11. The electrical feedthrough of claim 1, wherein the tubular conduit comprises a tubular bump.

12. The electrical feedthrough of claim 1, wherein the flange comprises a circular circumference with a flat edge disposed therealong.

13. A battery, comprising:
    a battery housing having a wall and an electrode assembly disposed therein, the electrode assembly comprising at least an electrode;
    an electrical feedthrough disposed through the wall of the battery housing and comprising:
        a tubular conduit having a flange at one end, the flange comprising a first surface disposed opposite a second surface, the first surface comprising a protrusion and a notch, the second surface disposed against the wall of the battery housing,
        an electrically-conductive terminal disposed through the tubular conduit and electrically-coupled to the electrode, wherein the protrusion is disposed between the electrically-conductive terminal and the notch,
        an electrically-insulating material disposed between the tubular conduit and the electrically-conductive terminal and forming a seal therebetween; and
        wherein the flange is welded to the wall of the battery housing.

14. The battery of claim 13, wherein the notch is a first notch, and the second surface comprises a second notch.

15. The battery of claim 13, wherein the tubular conduit comprises a taper that narrows along a direction away from the flange.

16. The battery of claim 13, wherein the flange comprises a circular circumference with a flat edge disposed therealong.

17. The battery of claim 13, wherein the flange has an outer diameter that ranges from 0.1 mm to 10 mm.

18. The battery of claim 17, wherein the outer diameter that ranges from 0.2 mm to 2.0 mm.

19. The battery of claim 17, the electrically-conductive terminal has a diameter that ranges from 20% to 70% of the outer diameter of the flange.

* * * * *